(No Model.)
W. H. TAYLOR.
TIRE FOR BICYCLES.
No. 568,813.         Patented Oct. 6, 1896.
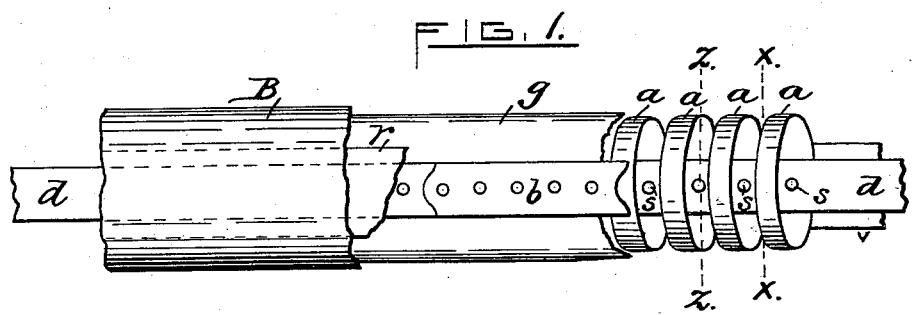
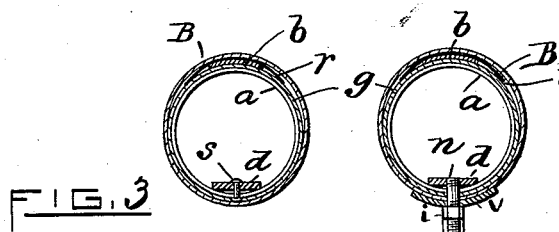
WITNESSES.         INVENTOR,
Charles T. Hannigan.         William H. Taylor
Howard B. Perry         by John G. Perry.
        Atty.

UNITED STATES PATENT OFFICE.

WILLIAM H. TAYLOR, OF NARRAGANSETT PIER, RHODE ISLAND.

TIRE FOR BICYCLES.

SPECIFICATION forming part of Letters Patent No. 568,813, dated October 6, 1896.

Application filed December 26, 1895. Serial No. 573,257. (No model.)

*To all whom it may concern:*

Be it known that I, WILLIAM H. TAYLOR, of Narragansett Pier, in the county of Washington and State of Rhode Island, have invented certain new and useful Improvements in Tires for Bicycles and other Vehicles; and I do hereby declare that the following is a full, clear, and exact description thereof, reference being had to the accompanying drawings, and to the letters of reference marked thereon, which form a part of this specification.

Figure 1 is a top view of a portion of a tire with a part of each successive covering removed to show the construction. Fig. 2 shows a cross-section of the tire, taken through the middle of one of the spring-rings. Fig. 3 shows a cross-section taken through between two of the rings. Fig. 4 shows an edge and a side view of one of the rings separated.

The object of the invention is to produce a tire that has the elasticity of the pneumatic tire without its liability to injury and at a less cost. Its construction is as follows:

$d$ is a strip or bar of metal of sufficient length to reach around the rim of the wheel to which the tire is to be applied.

$a\ a$ are spring-rings, a series of which are made fast by rivets or screws $s\ s$ at any desired distance apart, according to the stiffness of the rings and desired resiliency of the tire. The rivets $s\ s$ secure the rings to the bar $d$ by passing through both of them, as seen in Fig. 3. Over the rings $a$ and the bar $d$ a covering of canvas $g$ is put, and both entirely made fast by stitching, lacing, or cementing the meeting edges of the canvas together, as may be preferred. Short strips of steel $b$ are placed on the outside of the canvas cover, abuting each other, forming joints all the way around, with holes punched in them for lightness and for holding the fastenings, with a strip of canvas $r$ laid over these strips of steel and stitched down to the canvas $g$ on each side of the strip $r$, or it may be cemented down or otherwise fastened, as preferred. Then over the whole a covering of sheet india-rubber B is placed, that covers the whole tire of the wheel complete and is perfectly joined at its meeting edges with cement or otherwise, as may be preferred. This forms a very elastic tire that runs no risk of being disabled by cutting and puncturing by sharp fragments of glass or otherwise.

In Fig. 2 the way of attaching the tire to the rim $v$ of a bicycle is shown. A short wire $n$ has a screw-thread made on it the whole length, and is passed through a hole in the rim $v$ and secured in the bar $d$ between the rings $a$, and a nut $i$ is screwed on. Then the socket or coupling $c$ of the spoke $h$ is screwed on the other end of the wire and down to bear tightly on the nut.

Having thus described this my improvement, what I claim, and desire to secure by Letters Patent, in a tire for bicycles and other vehicles, as my invention is—

In a bicycle-tire the combination of a series of spring-rings, a short distance apart, a bar carried inside of said rings, and riveted to them, a textile covering for said rings and bar, and short strips of metal placed on the outside of said textile covering, without riveting, and held in place by a textile strip cemented over them, to the textile covering, substantially as described.

WILLIAM H. TAYLOR.

Witnesses:
JOHN G. PERRY,
HOWARD B. PERRY.